(12) United States Patent
Jacobs

(10) Patent No.: US 10,576,592 B2
(45) Date of Patent: Mar. 3, 2020

(54) ROTATING MILL VISE JAWS

(71) Applicant: Danny Larry Jacobs, Falkville, AL (US)

(72) Inventor: Danny Larry Jacobs, Falkville, AL (US)

( * ) Notice: Subject to any disclaimer, the term of this patent is extended or adjusted under 35 U.S.C. 154(b) by 0 days.

(21) Appl. No.: 15/731,071

(22) Filed: Apr. 14, 2017

(65) Prior Publication Data

US 2018/0297161 A1  Oct. 18, 2018

(51) Int. Cl.
*B23Q 3/06* (2006.01)
*B23Q 3/10* (2006.01)
*B25B 1/24* (2006.01)

(52) U.S. Cl.
CPC ............. *B23Q 3/066* (2013.01); *B23Q 3/062* (2013.01); *B23Q 3/103* (2013.01); *B25B 1/2436* (2013.01); *B25B 1/2442* (2013.01)

(58) Field of Classification Search
CPC ........... B25B 1/24; B25B 1/20; B25B 1/2415; B25B 1/2494; B25B 5/16; B25B 1/2452; B25B 1/2457; B25B 5/163; B25B 5/166
USPC .................................... 269/262, 43, 271, 156
See application file for complete search history.

(56) References Cited

U.S. PATENT DOCUMENTS

| | | | |
|---|---|---|---|
| 100,541 A * | 3/1870 | Mason ................. | B25B 1/2426 269/261 |
| 133,198 A * | 11/1872 | Butler ................... | B25B 1/2452 269/262 |
| 3,685,817 A * | 8/1972 | Worthington ......... | B25B 1/2442 269/139 |
| 5,037,075 A * | 8/1991 | Durfee, Jr. ............ | B25B 1/2463 269/271 |
| 8,191,879 B2 * | 6/2012 | Jang ....................... | B25B 5/163 269/257 |

(Continued)

FOREIGN PATENT DOCUMENTS

DE  10063988 A1 *  7/2001  ............. B25B 5/103

OTHER PUBLICATIONS

Translation of DE 10063988 A1 (Year: 2000).*

*Primary Examiner* — Tyrone V Hall, Jr.
*Assistant Examiner* — Abbie E Quann

(57) ABSTRACT

A vise jaw combination used with a milling machine vise to hold a work-piece having either parallel edges or non-parallel edges. Wherein, the milling machine vise in this application disposes at least one movable member having threaded holes cooperating with fasteners to join the movable member and the vise jaw combination comprising a vertical axis tool post, a horizontal axis tool post, and a rotatable vise jaw. Wherein, the vertical axis tool post comprises a detachable wall disposing correlative thru holes for cooperating with the threaded holes and fasteners disposed at the movable member, whereby the vertical axis tool post is joined to the movable member disposed at the milling machine vise. Wherein, the horizontal axis tool post comprises a rectangular base disposing a thru hole for receiving a vertical shaft disposed at the vertical axis tool post, whereby the horizontal axis tool post is joined to the vertical axis tool post. Wherein, the rotatable vise jaw consists of a one-piece structure disposing a thru hole for receiving a horizontal shaft disposed at the horizontal axis tool post, whereby the rotatable vise jaw is joined to the horizontal axis tool post.

9 Claims, 10 Drawing Sheets

(56) References Cited

U.S. PATENT DOCUMENTS 8,336,867 B1 * 12/2012 Warth .................... B25B 1/125
                                                              269/271
8,511,661 B2 * 8/2013 Huang .................... B23Q 3/04
                                                              269/309

* cited by examiner

ROTATING MILL VISE JAWS

BACKGROUND OF THE INVENTION

This invention relates to milling machine vises and particularly to the clamping jaws used in combination with these vises. At present, the opposing jaws remain parallel at their clamping faces so that they provide adequate clamping pressure for holding a work-piece having parallel edges. However, the present jaws do not provide adequate clamping pressure for holding a work-piece having a beveled edge, whereas the parallel clamping faces cannot align with the non-parallel edges of a beveled work-piece.

Accordingly, it is an object of this invention to provide a vise jaw combination used with a milling machine vise to hold a work-piece having either parallel edges or non-parallel edges. Wherein the milling machine vise in this application disposes at least one movable member having threaded holes cooperating with fasteners to join the movable member and the vise jaw combination comprising a vertical axis tool post, a horizontal axis tool post, and a rotatable vise jaw. Wherein, the vertical axis tool post comprises a detachable wall disposing correlative thru holes for cooperating with the threaded holes and fasteners disposed at the movable member, whereby the vertical axis tool post is joined to the movable member disposed at the milling machine vise. Wherein, the horizontal axis tool post comprises a rectangular base disposing a thru hole for receiving a vertical shaft disposed at the vertical axis tool post, whereby the horizontal axis tool post is joined to the vertical axis tool post. Wherein the rotatable vise jaw consists of a one-piece structure disposing a thru hole for receiving a horizontal shaft disposed at the horizontal axis tool post, whereby the rotatable vise jaw is joined to the horizontal axis tool post.

DETAILED DESCRIPTION

Figure 1:
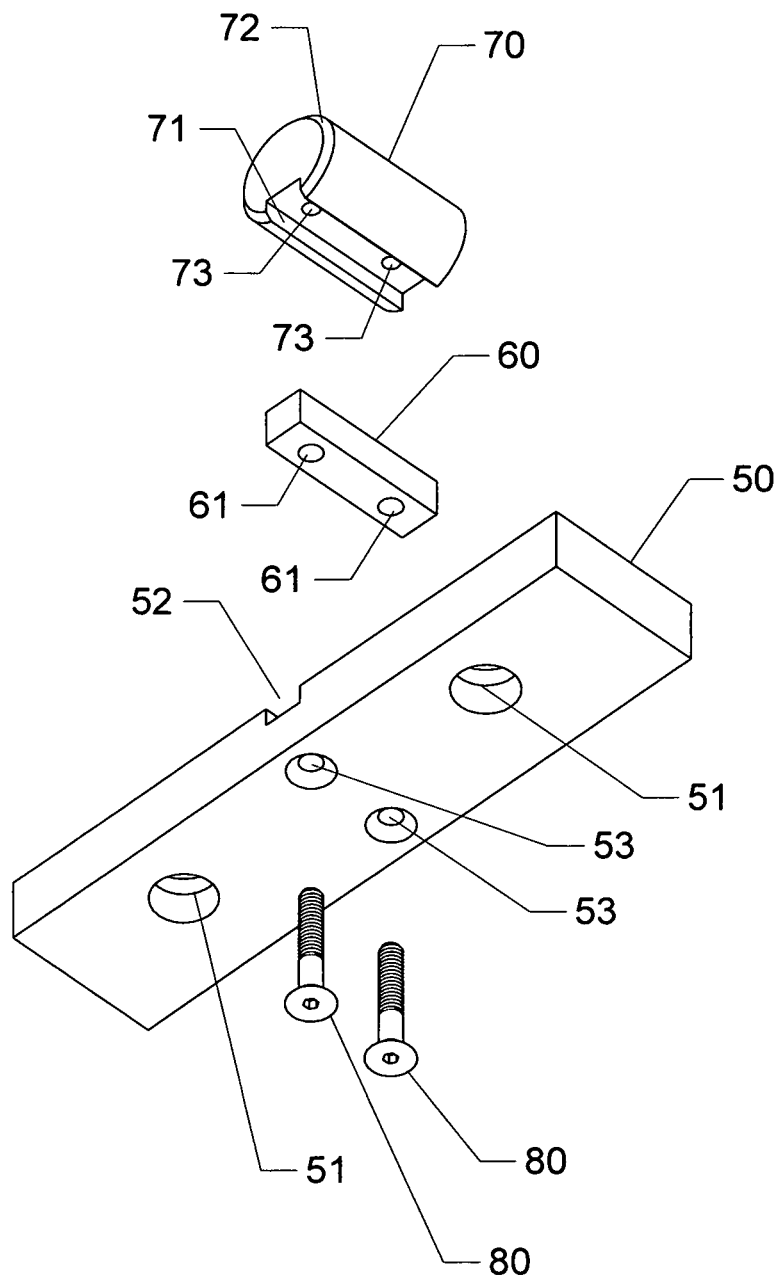
FIG. 1 is an exploded view of the vertical axis tool post assembly.
Figure 4:
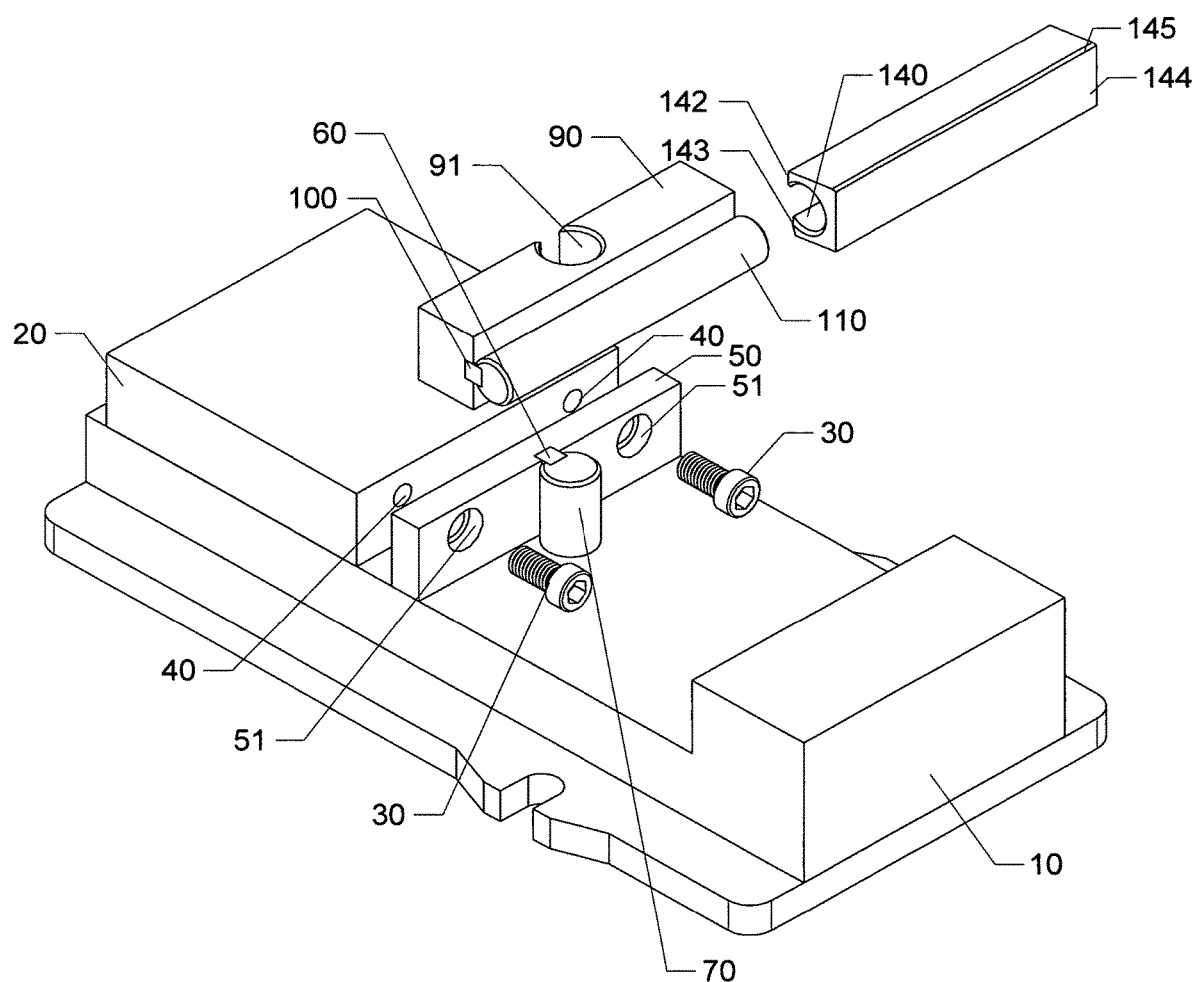
FIG. 4 is an isometric view showing the vertical axis tool post, the horizontal axis tool post, and the rotatable vise jaw separated from a milling machine vise having a moveable member.

Referring to FIG. 1 and FIG. 4, the vertical axis tool post comprises a detachable wall 50, a vertical support member 60, and a vertical shaft 70 joined together using fasteners 80 cooperating with holes 53, 61, and 73. To maximize joint strength, wall 50 and vertical shaft 70 have corresponding grooves 52 and 71 for receiving vertical support member 60. Detachable wall 50 disposes thru holes 51 for cooperating with fasteners 30 and threaded holes 40 to join the vertical axis tool post and movable member 20 disposed at milling machine vise 10. Vertical shaft 70 cooperates with thru hole 91 to join the vertical axis tool post and the horizontal axis tool post. Chamfered edges 72 and 92 facilitate connection of the vertical axis tool post and the horizontal axis tool post.

Figure 2:
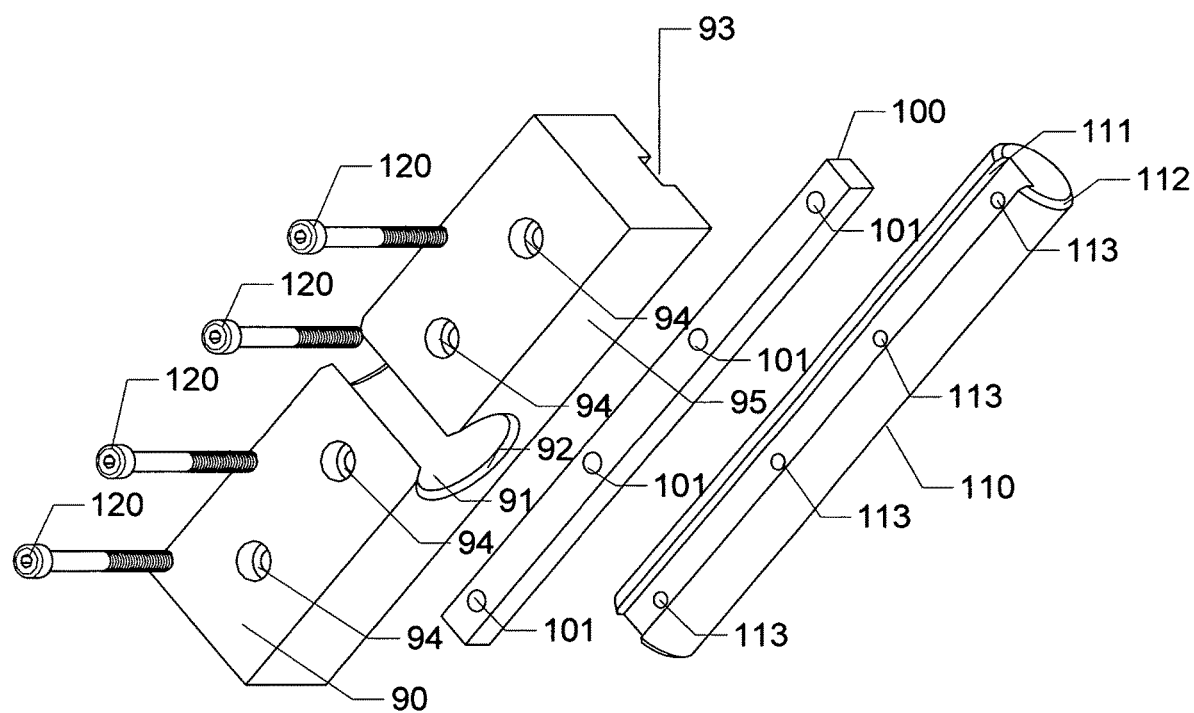
FIG. 2 is an exploded view of the horizontal axis tool post assembly.

Referring to FIG. 2 and FIG. 4, the horizontal axis tool post comprises a rectangular base 90, a horizontal support member 100, and a horizontal shaft 110 joined together using fasteners 120 cooperating with holes 94, 101, and 113. To maximize joint strength, rectangular base 90 and horizontal shaft 110 have corresponding grooves 93 and 111 for receiving horizontal support member 100. Rectangular base 90 disposes a thru hole 91 configured to slide over vertical shaft 70. Chamfered edges 112 and 141 facilitate connection of the horizontal axis tool post and the rotatable vise jaw.

Figure 3:
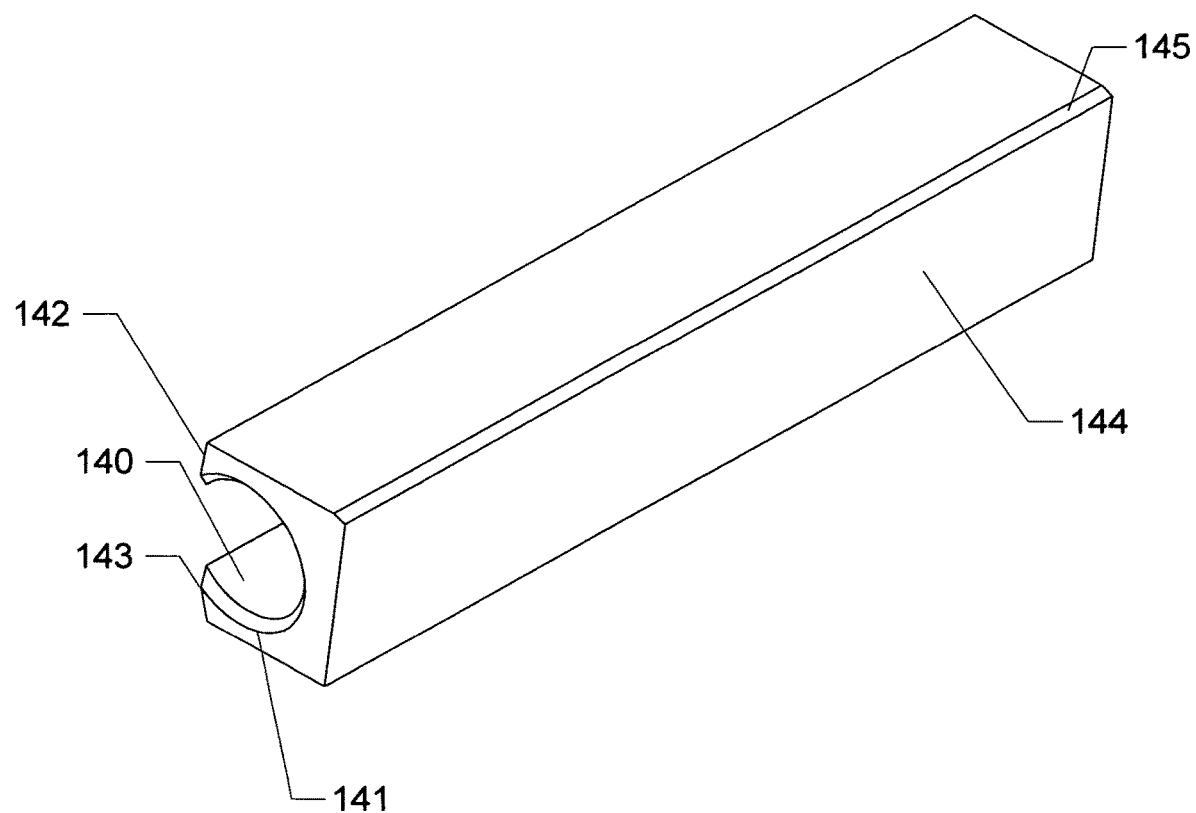
FIG. 3 is an isometric view of the rotatable vise jaw.

Referring to FIG. 3 and FIG. 4, the rotatable vise jaw consists of a one-piece structure disposing a thru hole 140 configured to slide over horizontal shaft 110. Chamfered edges 141 and 112 facilitate connection of the horizontal axis tool post and the rotatable vise jaw. Beveled edges 142 and 143 are configured so that the vise jaw is rotatable either clockwise or counterclockwise about horizontal shaft 110. 145 is a shoulder to break a sharp edge and to reinforce clamping face 144.

Figure 5:
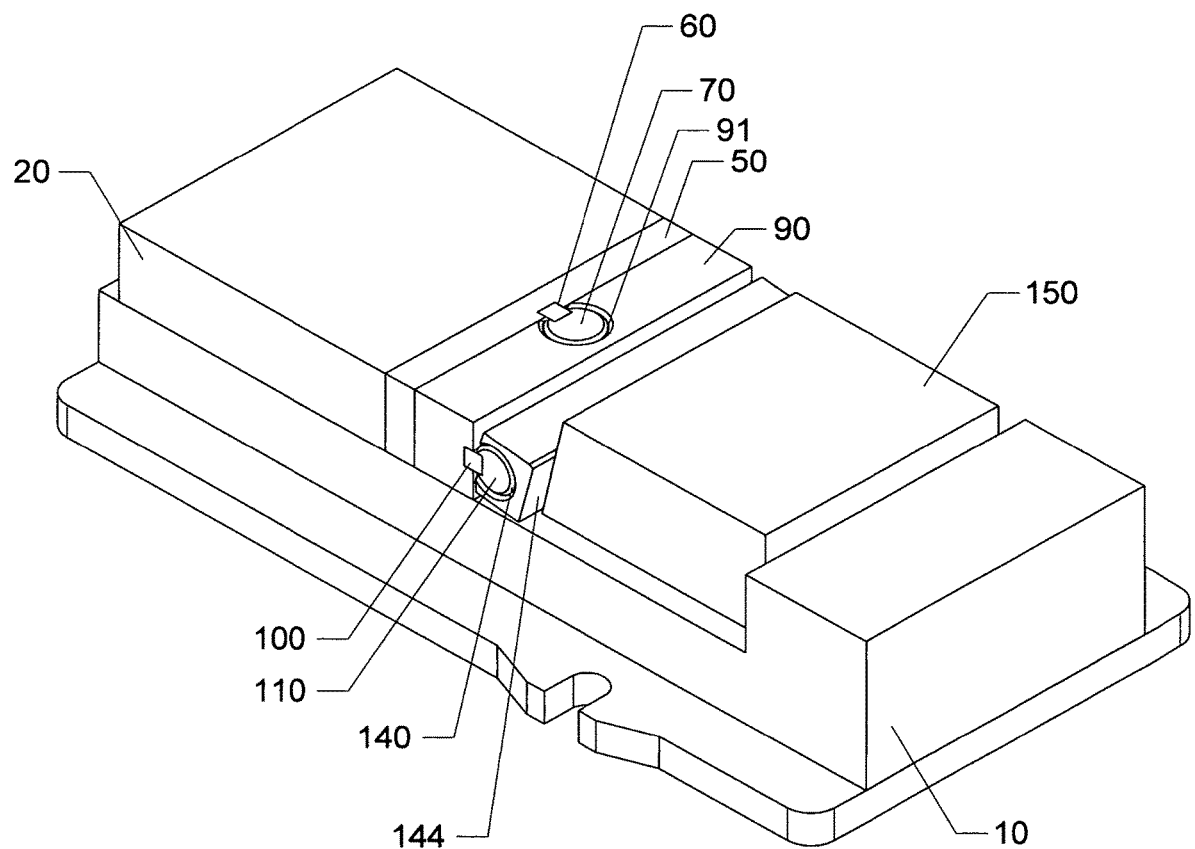
FIG. 5 is an isometric view showing the vise jaw combination used with a milling machine vise to hold a work-piece having non-parallel edges.

Referring to FIG. 4 and FIG. 5, the vise jaw combination is used with a milling machine vise 10 to hold a work-piece 150 having non-parallel edges. Threaded fasteners 30 cooperate with holes 51 and 40 to join the vise jaw combination and movable member 20 disposed at milling machine vise 10. Rectangular base 90 slides over vertical shaft 70 and rest against detachable wall 50 and milling machine vise 10. Thru hole 140 is configured so that the rotatable vise jaw slides over shaft 110 and rotates either clockwise or counterclockwise until it rests against rectangular base 90.

Figure 6:
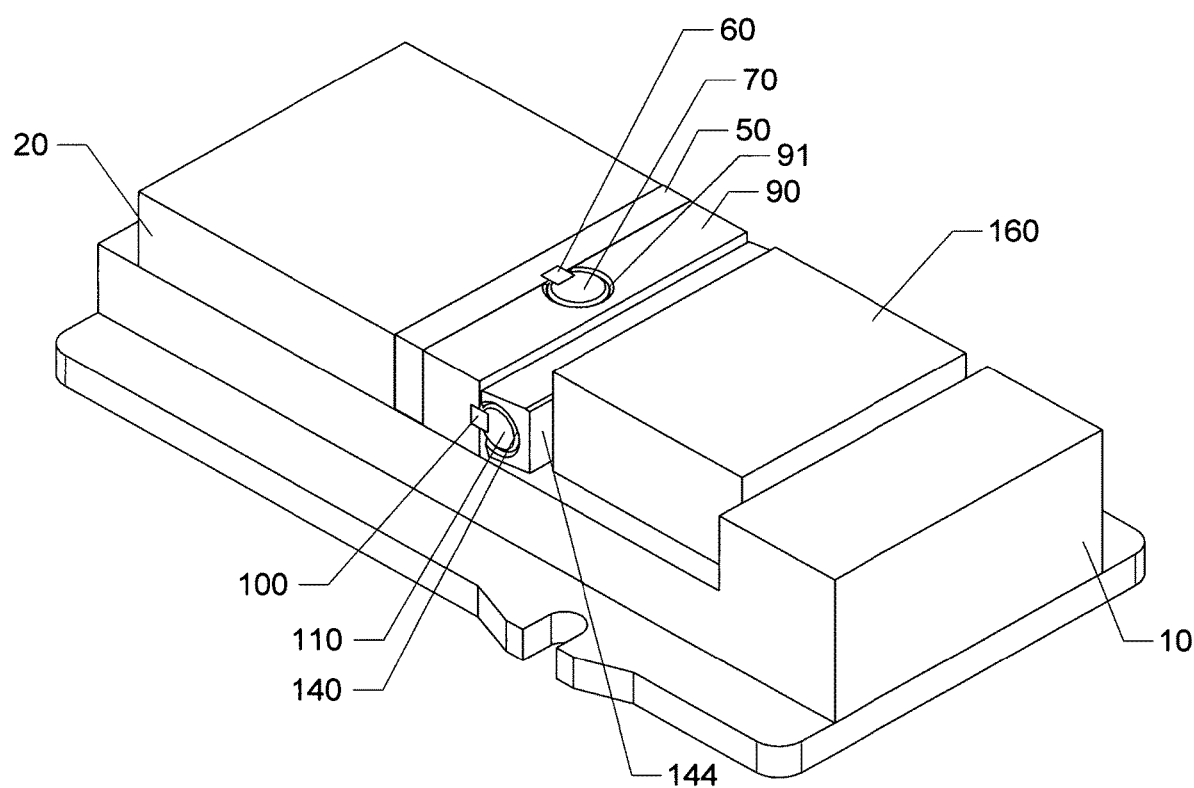
FIG. 6 is an isometric view showing the vise jaw combination used with a milling machine vise to hold a work-piece having parallel edges.
Figure 7:
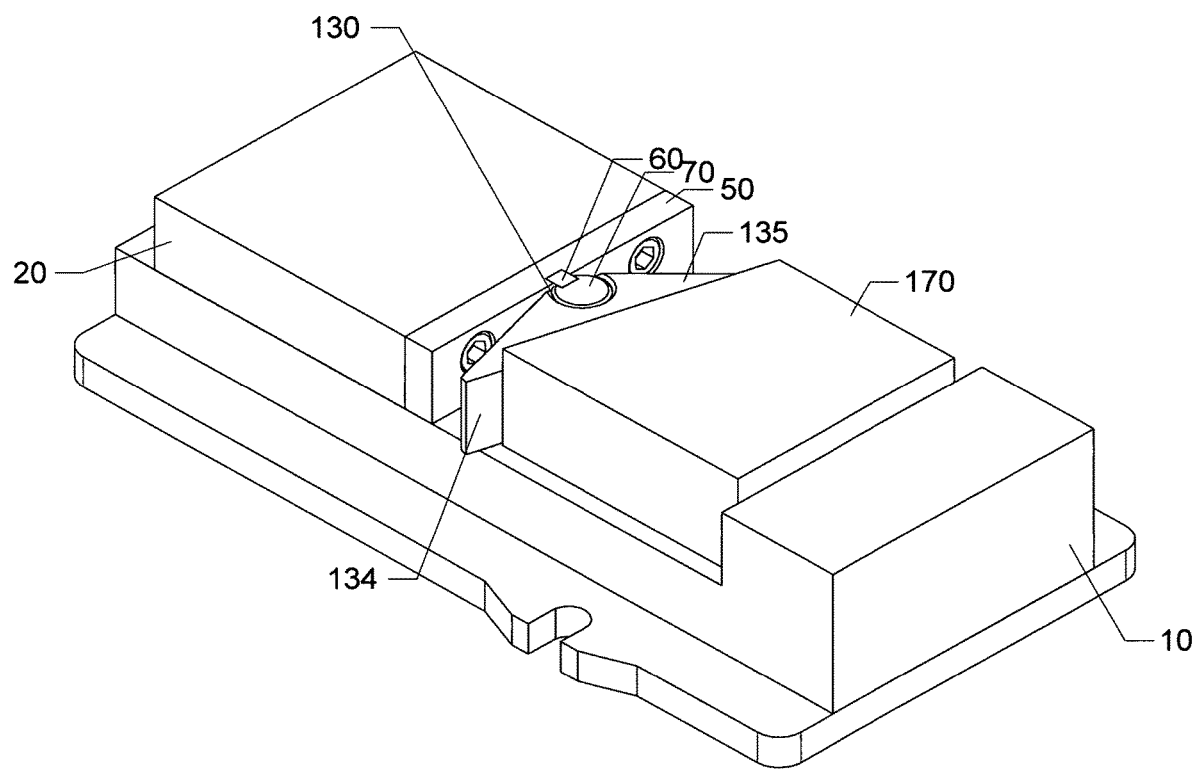
FIG. 7 shows matter depicted in a non-elected species and was included for reference only.
Figure 8:
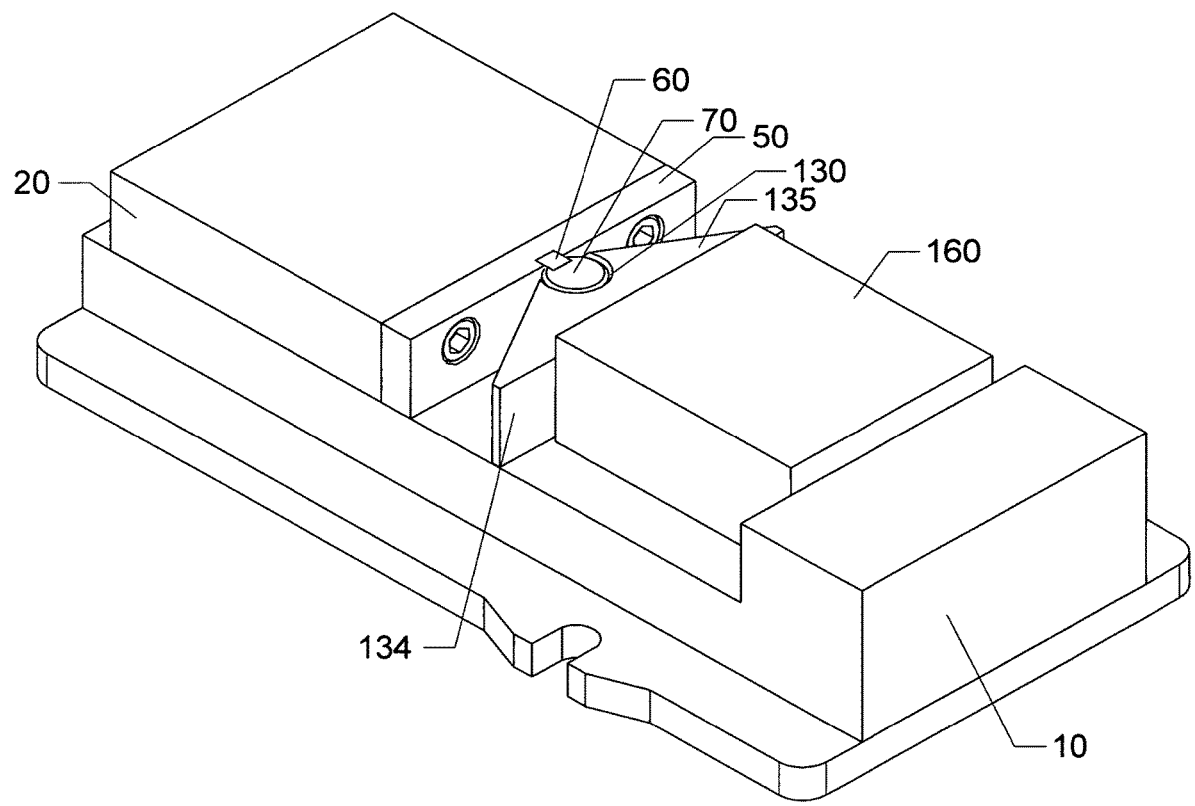
FIG. 8 shows matter depicted in a non-elected species and was included for reference only.
Figure 9:
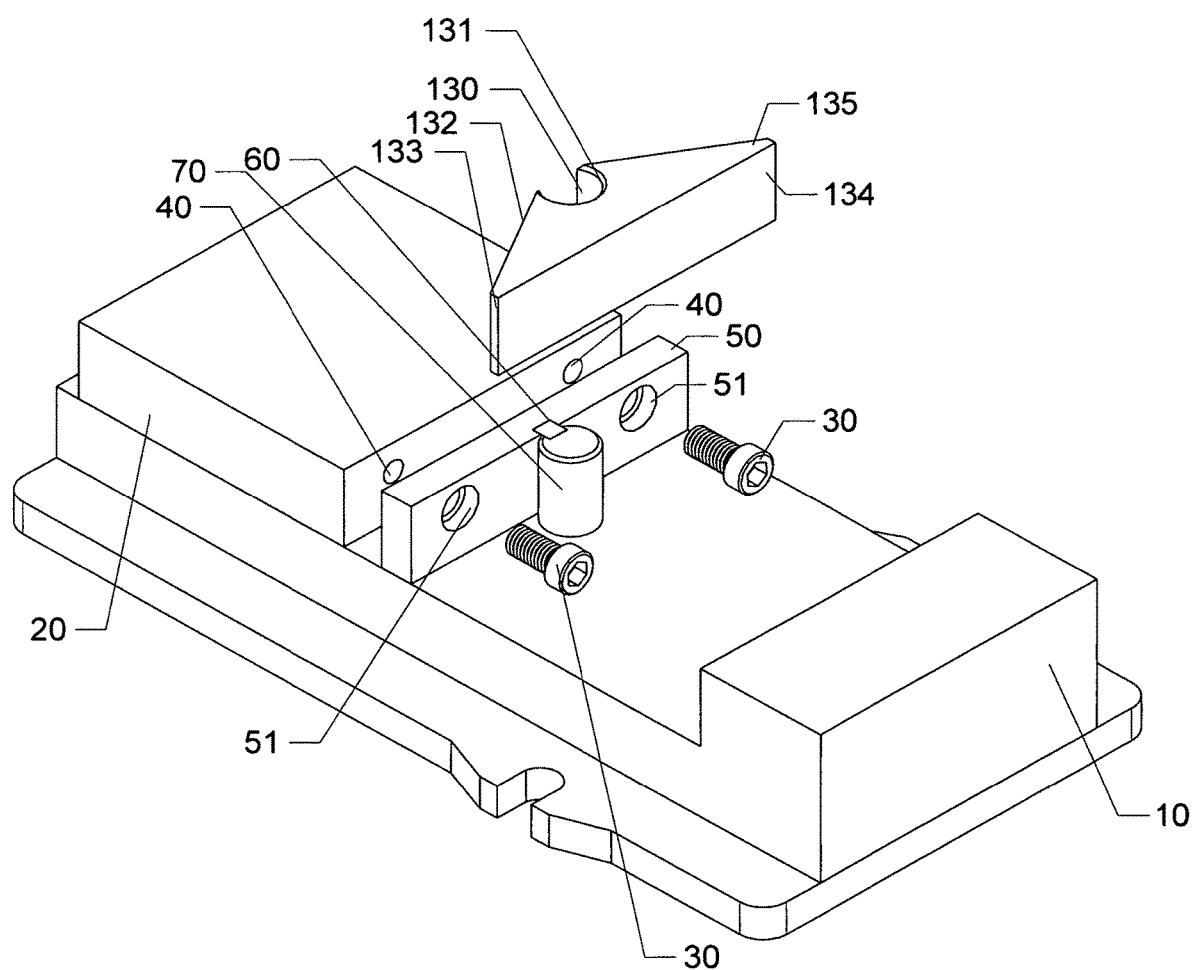
FIG. 9 shows matter depicted in a non-elected species and was included for reference only.
Figure 10:
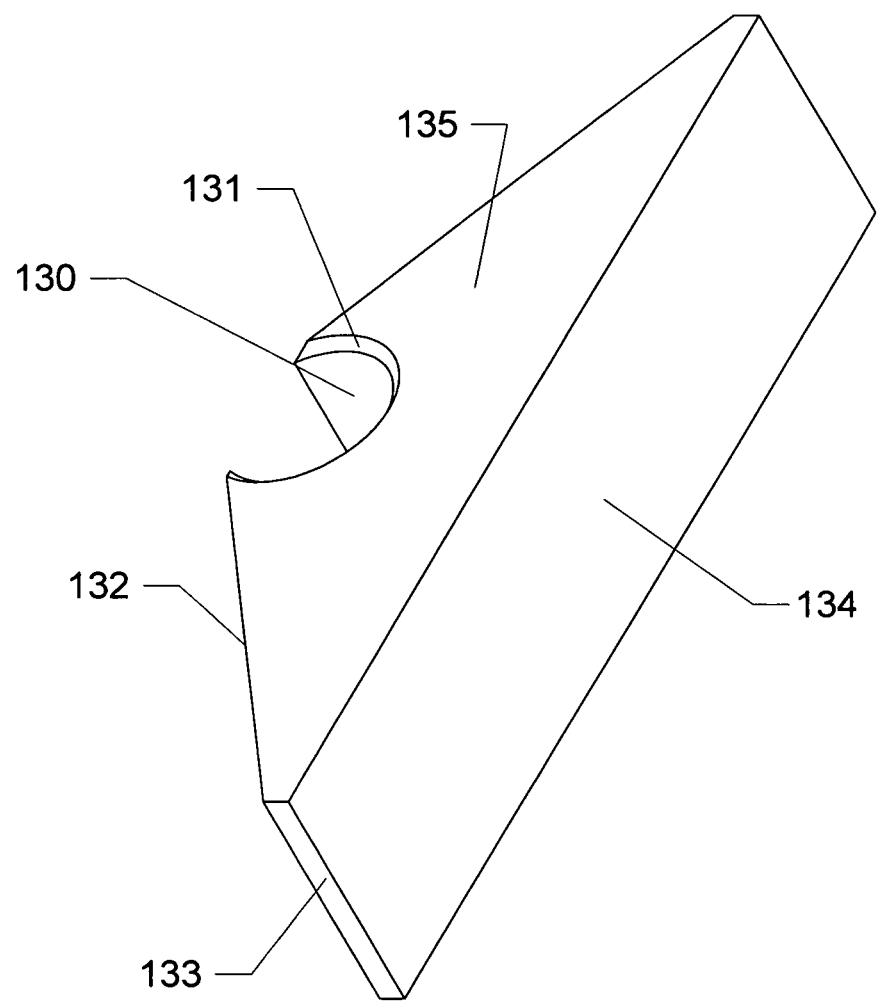
FIG. 10 shows matter depicted in a non-elected species and was included for reference only.

Referring to FIG. 4 and FIG. 6, the vise jaw combination is used with a milling machine vise 10 to hold a work-piece 160 having parallel edges. Threaded holes 30 cooperate with holes 51 and 40 to join the vise jaw combination and movable member 20 disposed at milling machine vise 10. Rectangular base 90 slides over vertical shaft 70 and rests against detachable wall 50 and milling machine vise 10. Thru hole 140 is configured so that the rotatable vise jaw slides over shaft 110 and rotates either clockwise or counter clockwise until it rests against rectangular base 90.

In conclusion of the detailed description of the invention, it should be noted that while there has been shown and described a preferred embodiment of the invention, it is understood that changes in structure, size, and materials can be made by those skilled in the art without departing from the improvements and advantages defined in the following claims.

I claim:

1. A vise jaw combination used with a milling machine vise to hold a workpiece having either parallel edges or non-parallel edges, wherein said milling machine vise has at least one movable member disposing threaded holes for cooperating with fasteners to join said movable member and said vise jaw combination comprising first, second and third elements, wherein said first element comprises:

a vertical axis tool post comprising a detachable wall disposing a vertical support member and vertical shaft, wherein said detachable wall and said vertical shaft have corresponding grooves for receiving said vertical support member, said detachable wall, said vertical support member, and said vertical shaft each have correlative holes cooperating with fasteners to join said detachable wall, said vertical support member and said vertical shaft, wherein said vertical shaft is adapted to slide inside a thru hole disposed on said second element;

said second element comprising: a horizontal axis tool post comprising a rectangular base disposing said thru hole configured to slide over said vertical shaft disposed on said detachable wall, wherein said rectangular base disposes a horizontal support member and horizontal shaft, wherein said rectangular base and said horizontal shaft have corresponding grooves for receiving said horizontal support member, said rectangular base, said horizontal support member and said horizontal shaft each have correlative holes cooperating with fasteners to join said rectangular base, said horizontal support member and said horizontal shaft;

said third element comprising: a rotatable vise jaw consisting of a one-piece structure and a thru hole disposed on said rotatable vise jaw, wherein said horizontal shaft comprises a horizontal longitudinal axis and wherein said thru hole disposed on said rotatable vise jaw is configured to slide along parallel to said horizontal longitudinal axis, whereby said rotatable vise jaw is joined to said horizontal shaft and said horizontal axis tool post and is rotatable about said horizontal shaft.

2. The tool of claim 1, wherein said detachable wall disposes correlative thru holes for cooperating with said threaded holes and said fasteners to join said detachable wall and said movable member disposed at said milling machine vise, whereby said vise jaw combination is connectable to said movable member disposed at said milling machine vise.

3. The tool of claim 1, wherein said vertical shaft is adapted to slide inside said thru hole disposed at said rectangular base, whereby said vertical axis tool post is joined to said horizontal axis tool post.

4. The tool of claim 1, wherein said thru hole disposed at said rectangular base is configured so that said rectangular base slides against said detachable wall.

5. The tool of claim 1, wherein said thru hole disposed at said rectangular base is configured so that said rectangular base does not rotate about said vertical shaft, whereas said rectangular base remains against said detachable wall while said horizontal axis tool post is joined to said vertical axis tool post.

6. The tool of claim 1, wherein said thru hole disposed at said rotatable vise jaw is configured so that said rotatable vise jaw slides past said rectangular base.

7. The tool of claim 1, wherein said vise jaw is configured to rotate clockwise about said horizontal shaft until said vise jaw rests against said rectangular base.

8. The tool of claim 1, wherein said vise jaw is configured to rotate counter clockwise about said horizontal shaft until said vise jaw rests against said rectangular base.

9. The tool of claim 1, wherein said thru hole disposed at said rectangular base is configured so that said rectangular base slides over said vertical shaft until said rectangular base rests against said milling machine vise.

\* \* \* \* \*